UNITED STATES PATENT OFFICE.

FRANK VICTOR RAYMOND, OF AUCKLAND, NEW ZEALAND.

PROCESS FOR THE TREATMENT OF KAURI AND OTHER LIKE GUMS.

1,245,273.  Specification of Letters Patent.  Patented Nov. 6, 1917.

No Drawing.  Application filed September 6, 1916. Serial No. 118,789.

*To all whom it may concern:*

Be it known that I, FRANK VICTOR RAYMOND, a subject of His Majesty the King of the United Kingdom of Great Britain and Ireland, resident of the city of Auckland, in the Provincial District of Auckland and Dominion of New Zealand, have invented new and useful Improvements in Processes for the Treatment of Kauri and other like Gums, of which the following is a specification.

This invention relates to the treatment applied to kauri and other like gums, for the purpose of removing therefrom the casing or incrustation of corroded or poor class of gum of comparatively small value, which surrounds or covers the more valuable gum, the removal of such casing or incrustation adding greatly to the market value of the better class gum.

At present the gum pieces, which are found in pieces of various sizes and shapes, and nearly always having rough and uneven surfaces, are scraped and rescraped by hand, involving much time and labor, besides which a good proportion of the good or valuable gum is lost.

According to this invention the gum pieces are subjected to the action of sand blasts operated by compressed air and containing sand of either uniform or different grades or qualities. The sand blasts may be employed alone or in conjunction with any of the following blasts; water blasts, steam blasts, drying blasts, steam and drying blasts together, or water and drying blasts together. The above accompanying blasts are employed for the purpose of cleaning and polishing the gum pieces to different degrees after the outer covering has been removed therefrom by the action of the said blasts. When more than one accompanying blasts are employed the final treatment accorded to the gum pieces is performed by compressed air or drying blasts.

The treatment of the gum pieces by the blasts above set forth takes place either while the gum pieces are stationary or in motion, and preferably but not necessarily, within an inclosed cabinet or casing.

The result of such treatment of the gum is that the latter is produced in a thoroughly clean and polished condition by the one operation with a minimum amount of loss of good gum and a minimum employment of labor.

The resultant powdered admixture of sand, and poorer class gum forced off the more valuable gum forms a by-product of some valve for purposes for which the poorer class gum is suited.

Having now fully described my invention, what I desire to claim and secure by Letters Patent is:—

1. Process for the treatment of kauri and other like gums, by the application thereto of sand blasts operated by compressed air for the purpose set forth.

2. Process for the treatment of kauri and other like gums by the application thereto of sand blasts containing sand of varying grades and operated by compressed air for the purpose set forth.

3. Process for the treatment of kauri and other like gums by the application thereto of sand blasts, and water blasts, for the purpose set forth.

4. Process for the treatment of kauri and other like gums by the application thereto of sand blasts, and steam blasts for the purpose set forth.

5. Process for the treatment of kauri and other like gums by the application thereto of sand blasts and drying blasts for the purpose set forth.

6. Process for the treatment of kauri and other like gums, by the application thereto of sand blasts, steam blasts and compressed air blasts, for the purpose set forth.

7. Process for the treatment of kauri and other like gums by the application thereto of sand blasts, water blasts and drying blasts for the purpose set forth.

8. Process for the removal of the exterior deteriorated coating of kauri and other like gum by the application thereto of sand and steam blasts while the gum is in motion substantially as described.

9. Process for the treatment of kauri and other like gums by the application thereto of sand blasts, directed on to the gum while the latter is in motion for the purpose set forth.

FRANK VICTOR RAYMOND.

Witnesses:
GEORGE WILLIAM BASKY,
ERNEST WILFRED BOYCE CAREY.